United States Patent
Norden

(10) Patent No.: US 10,001,645 B2
(45) Date of Patent: Jun. 19, 2018

(54) USING A SECOND SCREEN AS A PRIVATE TRACKING HEADS-UP DISPLAY

(71) Applicant: Sony Interactive Entertainment America LLC, San Mateo, CA (US)

(72) Inventor: Christopher Norden, Foster City, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 208 days.

(21) Appl. No.: 14/158,771

(22) Filed: Jan. 17, 2014

(65) Prior Publication Data
US 2015/0205106 A1   Jul. 23, 2015

(51) Int. Cl.
*G02B 27/01* (2006.01)
*G06F 3/0486* (2013.01)
(Continued)

(52) U.S. Cl.
CPC ......... *G02B 27/01* (2013.01); *G02B 27/0093* (2013.01); *G02B 27/017* (2013.01); *G06F 3/012* (2013.01); *G06F 3/013* (2013.01); *G06F 3/0346* (2013.01); *G06F 3/0484* (2013.01); *G06F 3/0486* (2013.01); *G06F 3/1454* (2013.01); *G09G 5/14* (2013.01);
(Continued)

(58) Field of Classification Search
CPC .. G02B 27/01; G02B 27/017; G02B 27/0093; G02B 2027/0138; G02B 2027/0187; G02B 2027/0178; G02B 2027/0132; G06F 3/1454; G06F 3/012; G06F 3/013; G06F 3/0484; G06F 3/0346
See application file for complete search history.

(56) References Cited

U.S. PATENT DOCUMENTS 5,140,677 A * 8/1992 Fleming et al. .............. 715/835
5,758,111 A * 5/1998 Shiratori et al. ............. 715/788
(Continued)

FOREIGN PATENT DOCUMENTS

JP    2006277239 A    10/2006
JP    2009-93593 A    4/2009
(Continued)

OTHER PUBLICATIONS

ISR and Written Opinion, PCT/US2015/011274, dated Apr. 21, 2015, 39 pages.

*Primary Examiner* — Mihir K Rayan
(74) *Attorney, Agent, or Firm* — Martine Penilla Group, LLP

(57) ABSTRACT

Methods for extending a viewing area of a display device for displaying content include detecting presence of an eye glass computing device proximate to a primary computing device. The primary computing device has a primary display that is configured to render content. The eye glass computing device includes a secondary device. The eye glass computing device is linked to the primary computing device. A view direction of the eye glass computing device is detected relative to the primary display. Additional content is rendered in the secondary display that is in addition to the content rendered in the primary display. The secondary display is an extension of the primary display for viewing the content beyond the content rendered on the primary display.

29 Claims, 14 Drawing Sheets

(51) Int. Cl.
*G02B 27/00* (2006.01)
*G06F 3/0346* (2013.01)
*G06F 3/14* (2006.01)
*G06F 3/01* (2006.01)
*G06F 3/0484* (2013.01)
*G09G 5/14* (2006.01)

(52) U.S. Cl.
CPC ........... *G02B 2027/0132* (2013.01); *G02B 2027/0138* (2013.01); *G02B 2027/0178* (2013.01); *G02B 2027/0187* (2013.01); *G06F 3/1446* (2013.01); *G09G 2320/0261* (2013.01); *G09G 2356/00* (2013.01); *G09G 2370/16* (2013.01)

(56) References Cited

U.S. PATENT DOCUMENTS

| | | | | |
|---|---|---|---|---|
| 5,977,935 | A | 11/1999 | Yasukawa et al. | |
| 6,292,158 | B1* | 9/2001 | Amafuji | G02B 27/017 345/672 |
| 6,717,556 | B2* | 4/2004 | Asahi et al. | 345/1.1 |
| 8,046,719 | B2* | 10/2011 | Skourup | G06F 3/011 715/757 |
| 8,427,396 | B1* | 4/2013 | Kim | G06F 3/1454 345/8 |
| 8,502,780 | B1 | 8/2013 | Park | |
| 8,994,721 | B2* | 3/2015 | Matsuda | G06F 3/04815 345/419 |
| 2006/0028400 | A1* | 2/2006 | Lapstun | G02B 26/06 345/8 |
| 2006/0082583 | A1* | 4/2006 | Leichtling et al. | 345/522 |
| 2006/0119574 | A1* | 6/2006 | Richardson | G06F 3/012 345/156 |
| 2007/0174291 | A1* | 7/2007 | Cooper | G06F 17/30905 |
| 2007/0250788 | A1* | 10/2007 | Rigolet | G06F 3/0481 715/788 |
| 2009/0027302 | A1* | 1/2009 | Li | G06F 3/1423 345/1.1 |
| 2010/0066821 | A1* | 3/2010 | Rosener | G06F 3/011 348/77 |
| 2010/0085469 | A1* | 4/2010 | Takemasa | H04N 5/232 348/345 |
| 2010/0105479 | A1* | 4/2010 | Wilson et al. | 463/37 |
| 2011/0285704 | A1* | 11/2011 | Takeda | A63F 13/54 345/419 |
| 2012/0075167 | A1* | 3/2012 | Lahcanski | G06F 3/1454 345/8 |
| 2012/0088581 | A1* | 4/2012 | Mao et al. | 463/32 |
| 2012/0242560 | A1* | 9/2012 | Nakada et al. | 345/8 |
| 2012/0326961 | A1* | 12/2012 | Bromer | G06F 3/044 345/156 |
| 2012/0327116 | A1 | 12/2012 | Liu et al. | |
| 2013/0147686 | A1* | 6/2013 | Clavin et al. | 345/8 |
| 2013/0222410 | A1 | 8/2013 | Kameyama et al. | |
| 2013/0241801 | A1 | 9/2013 | Petrick et al. | |
| 2013/0252600 | A1* | 9/2013 | Seo | G06F 3/01 455/420 |
| 2014/0015736 | A1 | 1/2014 | Kim | |
| 2014/0256429 | A1* | 9/2014 | Kobayashi | A63F 13/02 463/31 |
| 2015/0009132 | A1 | 1/2015 | Shinobu et al. | |

FOREIGN PATENT DOCUMENTS

JP 2012-233962 A 11/2012
WO WO 2006043977 A1 4/2006

* cited by examiner

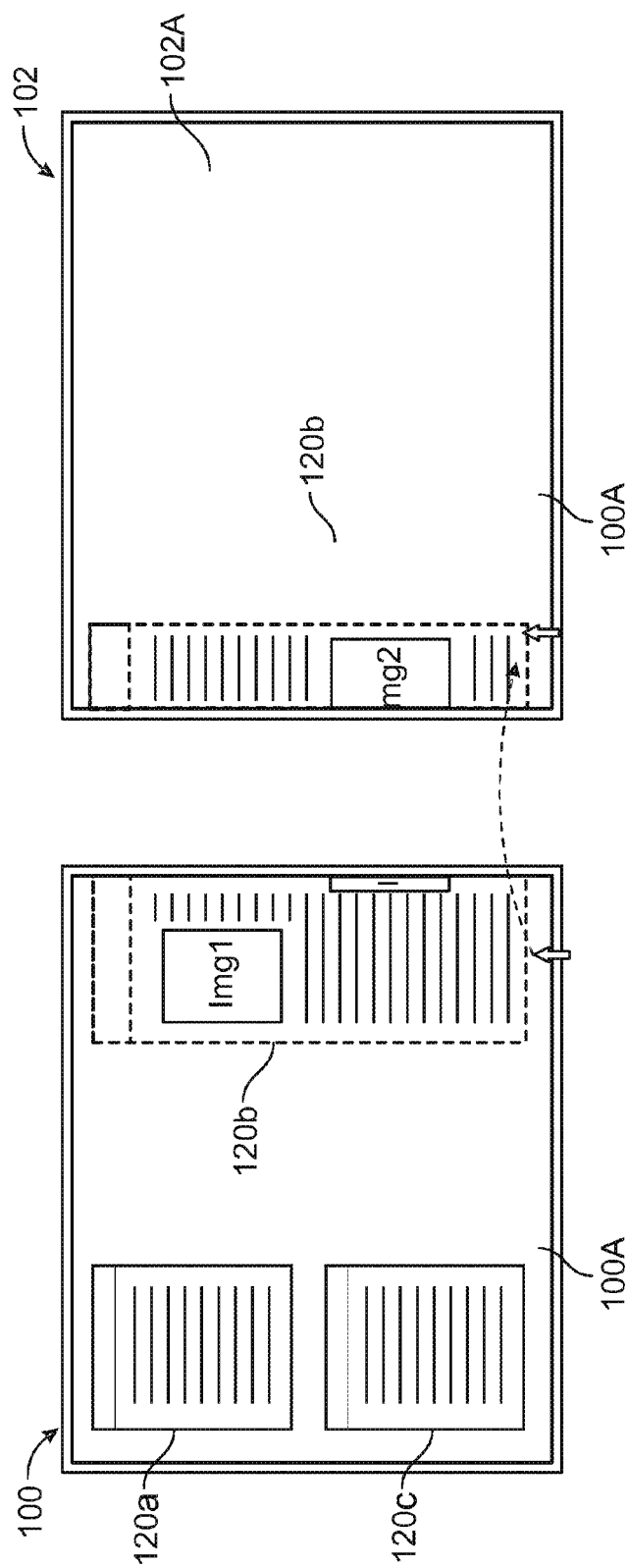

USING A SECOND SCREEN AS A PRIVATE TRACKING HEADS-UP DISPLAY

RELATED APPLICATIONS

This application is related to the U.S. patent application Ser. No. 12/903,123, entitled "USING A PORTABLE GAMING DEVICE TO RECORD OR MODIFY A GAME OR APPLICATION IN REAL-TIME RUNNING ON A HOME GAMING SYSTEM," filed on Oct. 12, 2010, the disclosure of which is herein incorporated by reference in its entirety.

BACKGROUND

1. Field of the Invention

The present invention relates to methods and systems for providing additional screen area for presenting an interactive application.

2. Description of the Related Art

The computing world has seen many advances over the years. As computing power has expanded, so has the desire to multi-task. As part of multi-tasking, users are able to open up multiple windows of applications on a monitor connected to a computing device and work on the various applications simultaneously. As more and more applications are being opened in distinct windows, it is becoming increasingly evident that the display region of the monitor is in-sufficient to render all the windows simultaneously.

With the expansion of the computing power of mobile computing devices and rising popularity of these devices, mobile computing devices are in effect increasingly becoming the device of choice to access and interact with various applications, such as interactive social media applications, interactive gaming applications, search applications, electronic mail applications, etc.

Another growing trend is in the video gaming industry. As computing power has expanded, developers of video games have likewise created game software that takes advantage of these increases in computing power. To this end, video game developers have been coding games that incorporate sophisticated operations and mathematics to produce a very realistic game experience.

With the evolution of the video game industry and the expansion of the computing power of various computing devices, including the mobile devices, users are able to increasingly use the mobile computing devices to interact with video games. As a result, the developers of video games are increasingly developing game software or game interface that takes advantage of the increase in computing power within the mobile computing devices (or simply "mobile devices") to enable the users to access and interact with the video games executing locally on a game console or executing remotely on a game server accessed over a cloud gaming system. Today's mobile devices include several different types of hardware integrated into a single device to enable the users to interact with the various applications. For example, many of the mobile devices include a color display, a camera, speakers, and an input mechanism such as buttons, a touch-screen or a stylus, etc., to allow such interaction.

With the growing trend in the video gaming industry and/or use of computing/mobile devices, it is desirable to supplement the limited screen area provided in computing devices, mobile devices, etc., so as to enable users to multitask.

It is in this context that embodiments of the invention arise.

SUMMARY

Embodiments of the present invention provide methods for extending a viewing area of a display device for rendering content selected on a computing device. It should be appreciated that the present invention can be implemented in numerous ways, such as a process, an apparatus, a system, a device or a method on a computer readable medium. Several inventive embodiments of the present invention are described below.

In one embodiment, a method is disclosed. The method includes detecting presence of an eye glass computing device proximate to a primary computing device having a primary display. The primary display of the primary computing device is configured to render content. The eye glass computing device includes a secondary display. The eye glass computing device is linked to the primary computing device. A view direction of the eye glass computing device relative to the primary display, is detected. In addition to the content rendered in the primary display, additional content is rendered in the secondary display. The secondary display acts as an extension of the primary display for viewing content beyond the content rendered on the primary display.

In one embodiment, changes to the view direction are detected and are used to define an extent of the additional content that has to be presented in the secondary display.

In one embodiment, the view direction is updated by tracking the eye glass computing device using a camera of the primary computing device.

In one embodiment, the eye glass computing device is configured to be worn on a head of a user and the view direction is updated by head tracking using a camera of the primary computing device.

In one embodiment, more or less of the additional content cause dynamic expansion or shrinkage of the secondary display to accommodate the virtual display of the additional content. The resulting secondary display extending to form a circular viewing area with the primary display to render the content and the additional content.

In one embodiment, more or less of the virtual display are presented based on an amount of view offset defined by the view direction.

In one embodiment, a method is disclosed. The method includes detecting a pair of glasses having an identifier associated with a user account. The pair of glasses includes a processor for enabling wireless communication with a computing device and a glasses display screen. A view position is associated with the pair of glasses when the pair of glasses is directed toward a main display screen of the computing device. The view position of the pair of glasses is associated with a reference point defined in relation to the main display screen. View direction is detected for the pair of glasses in relation to the reference point. Additional content is rendered on the glasses display screen based on the detected view direction. The glasses display screen is a virtual extension of the main display screen.

In one embodiment, a method for extending a viewing area of a display device for displaying content, is disclosed. According to the method, a pair of glasses is synchronized with a computing device. The computing device is configured to execute a plurality of applications and select a plurality of icons that are rendered in distinct windows on the main display screen of the computing device. The synchronizing allows the main display screen of the computing device to pair with a secondary display screen defined in the pair of glasses. Movement of one or more application windows out of the main display screen of the computing device, is detected. In response to the detection, the application windows moved out of the main display screen of the computing device are automatically presented on the secondary display screen of the pair of glasses.

In one embodiment, the computing device is a base computing device that executes the application locally within the computing device.

In one embodiment, the computing device is configured to execute the applications on a cloud server within a cloud system.

In one embodiment, the pair of glasses includes a processor and a network connection interface to interact with the computing device.

In one embodiment, the network connection interface of the pair of glasses uses a wireless connection protocol to interact with the computing device.

In one embodiment, the synchronizing allows use of input and output devices of the computing device for interacting with the windows moved into the secondary display screen.

In one embodiment, the detecting includes identifying direction and sequence of movement of the one or more windows out of the main display screen. The direction and sequence defines placement of the respective windows in the secondary display screen, wherein the placement is associated with a placement identifier.

In one embodiment, the application windows moved out of the main display screen are presented in the secondary display screen in chronological order of movement.

In one embodiment, the application windows moved out of the main display screen are presented in the secondary display screen in a reverse chronological order of movement.

In one embodiment, a selection of a window rendered in the secondary display screen is detected, and, in response, the selected window is moved out of the secondary display screen back to the main display screen of the computing device for user interaction.

In one embodiment, a selection of a window presented in the secondary display screen is detected. In response to the detection, the application rendered in the selected window allows interaction while continuing to render the selected window in the secondary display screen.

In one embodiment, the secondary display screen covers a portion or an entire area of one or both of the pair of glasses.

In another embodiment, a method is disclosed. The method includes detecting a pair of glasses having an identifier associated with a user account. The pair of glasses having a processor for enabling wireless communication with a computing device and having a glasses display screen. A view position is associated for the pair of glasses when the pair of glasses is directed toward a main display screen of the computing device. The view position of the pair of glasses is associated with a reference point provided in relation to the main display screen. Content is rendered on the main display screen and additional content is rendered on the glasses display screen. The additional content on the glasses display screen is rendered upon detecting a change in the view position of the pair of glasses that is away from the main display screen. The glasses display screen acts as a virtual extension of the main display screen.

In one embodiment, a pairing of the pair of glasses to the computing device is performed to enable detection of the pair of glasses.

In one embodiment, the reference point is defined by one or more virtual position markers defined for the main display screen of the computing device. The view position is defined using relative coordinates of the virtual position markers.

In one embodiment, the pairing allows use of input and output devices of the computing device for interacting with the content rendered in the secondary display screen.

In one embodiment, the content includes an icon or content of an application executing in a window, wherein the content is rendered in distinct windows.

In one embodiment, the additional content rendered on the glasses display screen is moved from the main display screen.

In one embodiment, the additional content is organized on the glasses display screen in an order and direction of movement from the main display screen.

In one embodiment, the size of the secondary display screen is dynamically adjusted based on amount of additional content rendered in the secondary display screen.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIGS. 1-1 and 1-2 illustrate view angle of a user and corresponding line of view, in accordance to an embodiment of the invention.

FIGS. 2A-2C illustrate screen renditions of application windows in a main display screen and a secondary display screen, in accordance to an embodiment of the invention.

FIGS. 4A-1 and 4A-2 illustrate view angle computation during pairing of a pair of glasses with a computing device for extending a viewing area of a display device for displaying content in application windows, in accordance with an embodiment of the invention. FIG. 4A-3 illustrates a dynamically adjustable secondary display screen based on content moved into and out of the virtual screen area, in one embodiment of the invention.

DETAILED DESCRIPTION

The following embodiments describe methods and system for extending a viewing area of a display device by providing additional display area within a pair of glasses for rendering content of application and icons in distinct windows selected for rendering by a computing device. In one embodiment of the invention, the pair of glasses is equipped with a processor and network interconnectivity to connect to a computing device. The computing device includes a monitor having a main display screen for displaying content of applications/icons selected for execution/rendering by a user of the computing device. The content is rendered in distinct windows. The connection allows synchronization of the main display screen of the monitor associated with the computing device with a secondary display screen defined in the pair of glasses. When a select one of the windows is moved out of the main display screen of the computing device, the movement is detected by the computing device and, in response, the computing device ceases rendering the selected window in the main display screen of the monitor. The pair of glasses detects the movement of the window out of the display area of the monitor and renders the moved window in the display area of the pair of glasses. The secondary display screen defined within the pair of glasses acts as a virtual extension of the main display screen by providing additional viewing and interaction area for a user. Accordingly, methods and apparatus in accordance with embodiments of the invention will now be described with reference to the drawings.

It will be obvious, however, to one skilled in the art, that the present invention may be practiced without some or all of these specific details. In other instances, well known process operations have not been described in detail in order not to unnecessarily obscure the present invention.

Figure 1:
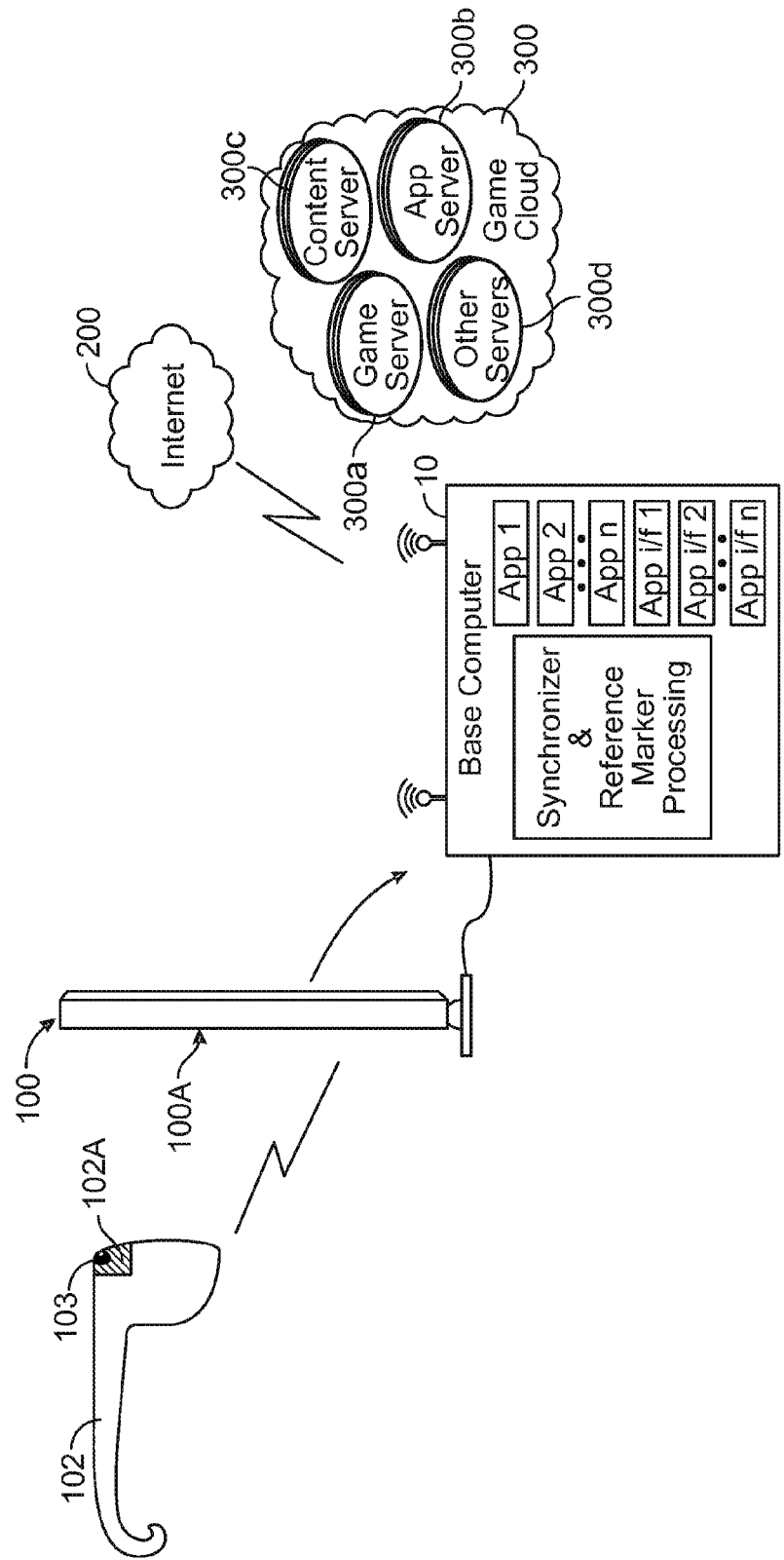
FIG. 1 illustrates simple block diagram of a computing system used for providing additional display area for rendering application windows, in accordance with an embodiment of the invention.

FIG. 1 illustrates a simple block diagram of a system for providing additional area for rendering application/icon windows in addition to the main display screen of a monitor of a computing device, in one embodiment of the invention. The system includes a computing device 10 that is configured to select and execute a plurality of interactive applications. The computing device 10 may be a base computing device, such as a desk top computing device, a lap top computing device, a tablet computing device or a mobile computing device. In this embodiment, the computing device may select icons or select and execute interactive applications locally within the computing device. In another embodiment, the computing device 10 is configured to select icons or execute interactive applications available on a cloud server 300 accessed over a network, such as the Internet 200, using an application interface. In one embodiment, the cloud server 300 may be accessed by the computing device 10 using an internet access point, such as a router (not shown). The cloud server 300, in one embodiment, may include a plurality of servers, such as game servers 300a, application servers 300b, content servers 300c, etc., executing a plurality of applications and providing a plurality of icons. A display monitor 100 is communicatively connected to the computing device 10 using a wired or wireless connection and acts as a main display screen. The monitor 100 may be any of various types of display devices, such as a television, a projector, or any other kind of display screen which may be utilized to visually display the interactive applications in distinct windows.

Figure 1A:
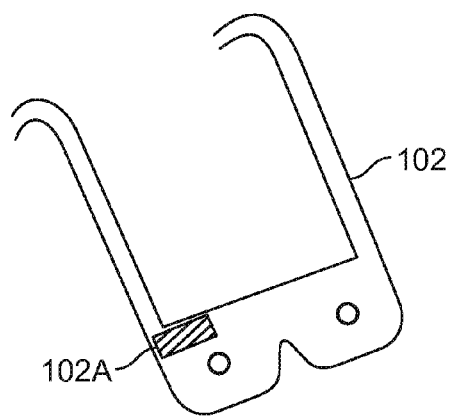
FIGS. 1A-1D illustrate location of a secondary display screen within a pair of glasses, in accordance to different embodiments of the invention.
Figure 1B:
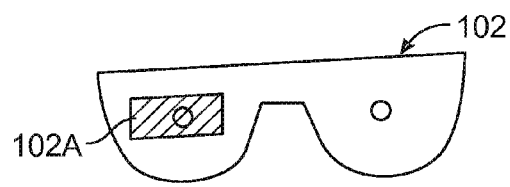
Figure 1C:
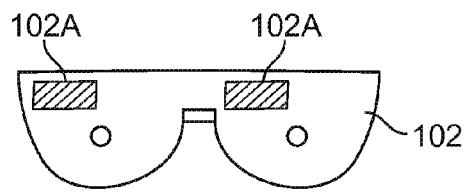
Figure 1D:
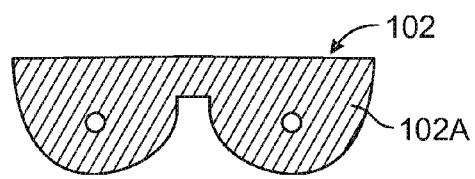
Figure 1:
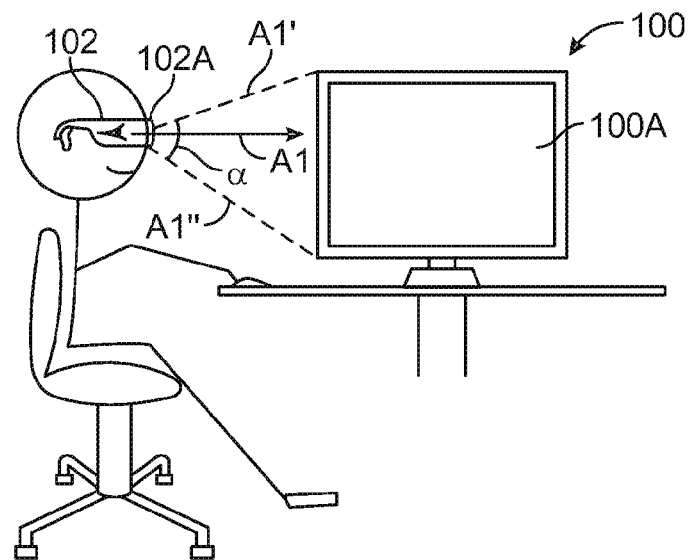

A pair of glasses 102 with a built-in processor (not shown) and wireless interconnectivity, is communicatively connected to the computing device 10 by pairing. The pair of glasses includes a display area, such as secondary display screen 102A. The pair of glasses is also equipped with a camera to capture the environment outside of the glasses. In one embodiment, the pair of glasses may be a heads-up display (HUD). In another embodiment, the pair of glasses may be a head mounted display (HMD). In yet another embodiment, instead of a pair of glasses, an eye glass computing device may be used to provide the same functionality of the various embodiments described herein. The display area of the glasses may cover a portion of one or both of the pair of glasses. In some embodiment, the portion of the glass may cover an entire area of the glass. FIGS. 1A-1D illustrate the various location within the pair of glasses 102 where the secondary display screen 102A is disposed. For example, as illustrated in FIG. 1A, the secondary display screen 102A is disposed at the top right corner of the glass covering a right eye when worn by a user. Alternately, the display area 102A may be disposed at the center of the glass covering one eye, (i.e., right eye) as illustrated in FIG. 1B, at the top left corner of the right and left eye glasses, as illustrated in FIG. 1C, or top left corner of the right and left eye glasses (not shown) or covering the entire surface of the pair of glasses 102, as illustrated in FIG. 1D. In the case of FIG. 1D, the display area may be a transparent display that presents data without requiring the users to look away from their viewpoint, in one mode and switch to a second mode to allow a user to view the images from different application/icon windows. In this case, the users will be able to transition between real world and virtual world to view the appropriate data projected by the processor of the glasses. The glasses may include one or more input devices, such as a touch-pad mounted on the side of the glasses, to allow user switching/transitioning from one mode to another. The touch-pad may also be used for other user interaction. For example, the touch-pad may be used to pair the glasses with a computing device and to synchronize the glasses with the computing device 10. The synchronization, in one embodiment, includes pairing the eye glass computing device or the pair of glasses with the primary computing device so as to synchronize the main display screen of the monitor 100 with the secondary display screen 102A defined in the glasses. In addition to synchronizing the display screens, the synchronization may allow usage of the input devices of the computing device 10 for interaction with the content rendered in the secondary display screen of the glasses, in one embodiment. In another embodiment, the synchronization may include synchronizing the input devices of the computing device 10 with the input devices of the glasses.

Input devices associated with the computing device 10 are used to select one or more interactive applications for execution or icons for rendering. In response to the selection/execution of the application, content of the one or more applications or icons may be rendered in distinct "application" windows at the main display screen of the monitor 100 to allow the user to interact with any of the applications/icons rendered in the application windows. Each application window is designed to render content of an icon or content of an application selected for execution at the computing device 10. The interactive applications/icons may be available locally in the computing device 10 or may be available on the cloud server. In the case where the application is available on the cloud, the computing device 10 may obtain a copy of the application and execute it locally within the computing device. Alternately, the application may be executed in the cloud and the application window may be provided at the main display screen of the monitor by the computing device to render content and to enable interaction with the application using an application interface. Similarly, the computing device may obtain a copy of the icons and render it at the main display screen of the monitor.

As part of the interaction, the user may select an application window rendered in the monitor 100 and move it out of the monitor's display screen. The computing device detects the movement and automatically removes the application window of the selected interactive application from the main display screen of the monitor 100. Simultaneously, the pair of glasses detects the movement of the application window into the display area (i.e., secondary display screen) in the glasses. The secondary display screen acts as an extension of a viewing area of the monitor by providing additional display area for rendering the application windows.

The display screen rendering application windows that is presented to the user based on the user's view point is illustrated with reference to FIGS. 1-1 and 1-2. When the view point of the user is at normal (i.e., when the user is looking straight ahead, as illustrated by line 'A1'), the display area defined by the main display screen 100A of the monitor 100 associated with the computing device is presented covering a normal view angle 'α' encompassing the area between broken lines A1' and A1", as illustrated in FIG. 1-1. When the user's view point shifts upward, as illustrated by line A2 in FIG. 1-2, to cover view angle 'β' encompassing the area between broken lines A2' and A2", the secondary display screen 102A defined in the display region of the glasses 102 is presented to the user. The user is able to use the display area 102A of the glasses 102 as a supplementary secondary display screen in addition to the main display area 100A of the monitor 100. In the embodiment illustrated in FIGS. 1, 1-1 and 1-2, the computing device is paired with the pair of glasses and the direction of a user's gaze is used to present the appropriate display screen area—either the main display screen area of the monitor or the secondary display screen area of the glasses.

The main display screen area of the monitor is primarily used to present distinct application windows for rendering icons and content of applications selected for execution by or for a user wearing the glasses. As the user executes more and more applications and selects a plurality of icons, content of each of the applications and/or icons is presented in a distinct window on the main display screen area of the monitor resulting in crowding the main display screen area of the monitor. The user may, in order to ease the crowding, move select one or more of the windows out of the main display screen area. In response to the movement, the computing device will cease the rendering of the select one or more windows in the main display screen area of the monitor and the pairing will cause the glasses to detect the movement and render the windows in the secondary display screen defined in the display portion of the glasses. The user may be able to interact with the application windows shifted to the secondary display screen of the glasses using the input devices associated with the computing device in a manner similar to the interaction when the application windows were rendered on the main display screen area of the monitor.

Figures 1, 2:
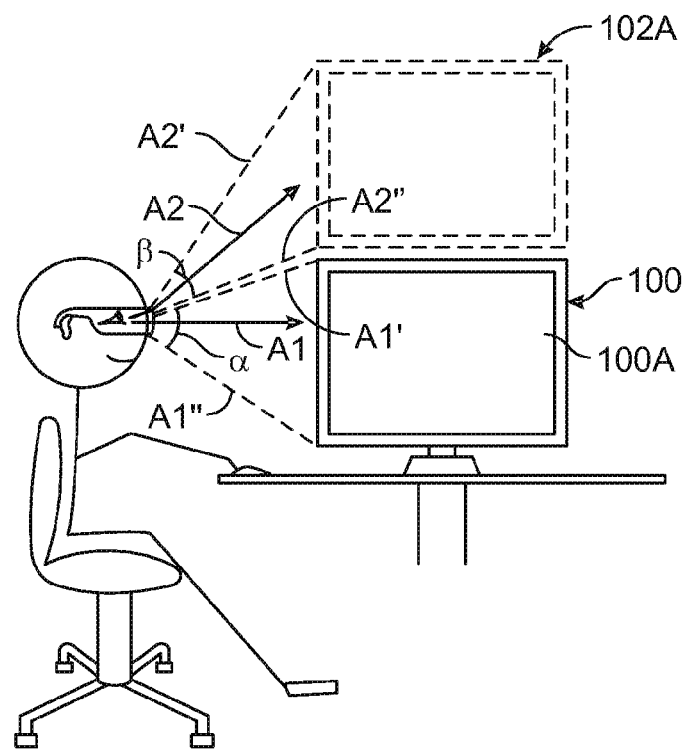
Figure 2A:
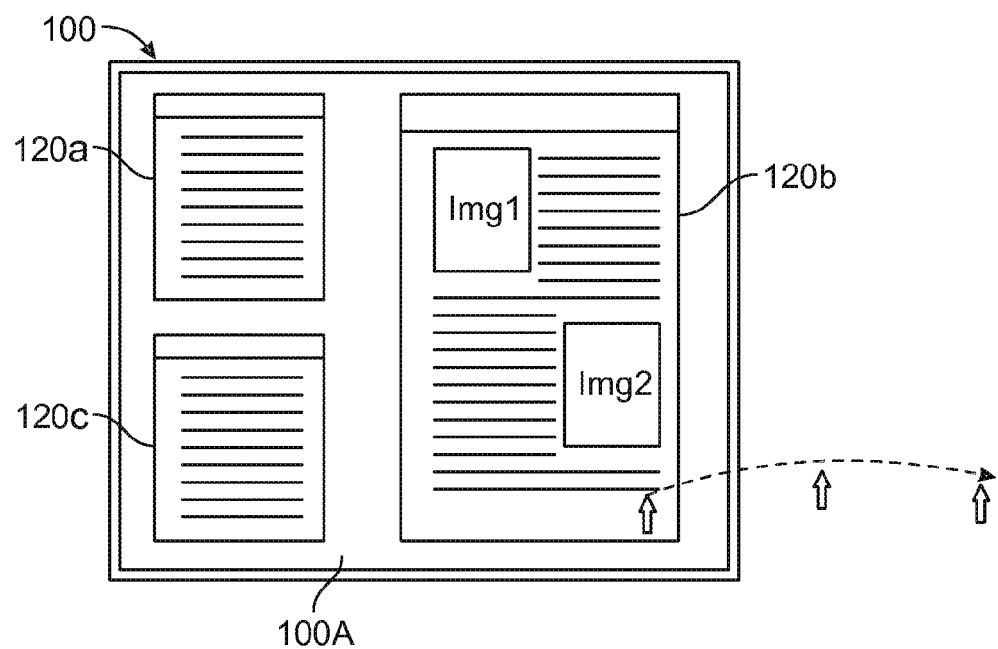
Figure 2C:
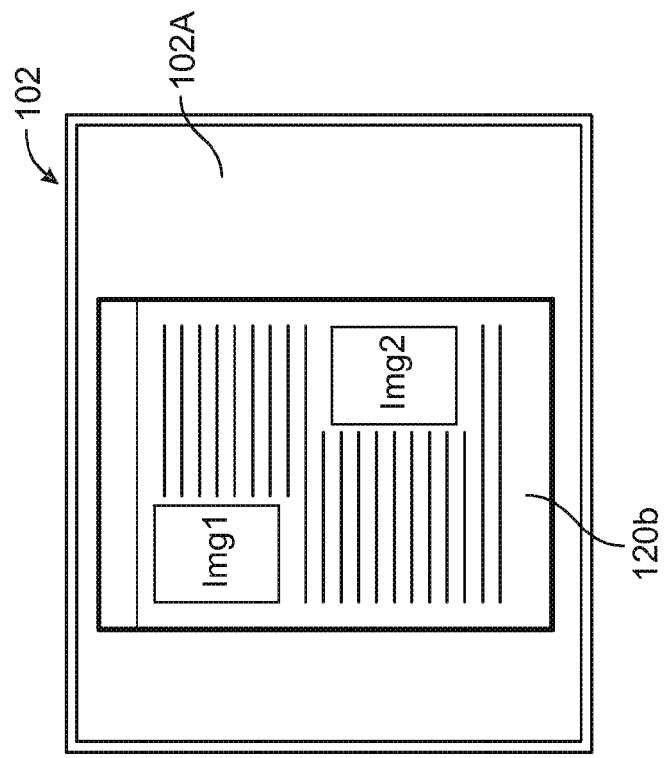
Figure 2C:
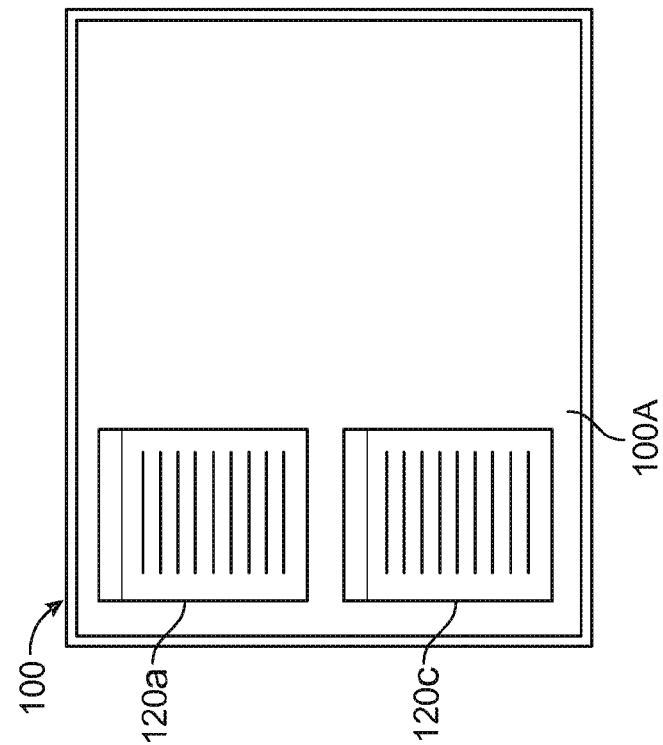

FIGS. 2A-2C illustrate simplified sample screen renditions of the main display screen area of a monitor and the secondary display screen of the pair of glasses, in one embodiment of the invention. As illustrated in FIG. 2A, plurality of windows, 120a, 120b, 120c, etc., are rendered on a main display screen area 100A of a monitor 100 of a computing device 10. Each window renders content of an application that is selected for execution either locally on the computing device 10 or remotely on the cloud server by the computing device or content of an icon. In the case of remote execution of applications, the computing device is communicatively connected to the cloud server over a network, such as the Internet, using network connectivity. The computing device 10 is also communicatively connected to a pair of glasses used by a user on which a secondary display screen is disposed, wherein the pair of glasses includes a processor and network connectivity to pair with the computing device 10. As part of the communication connection, the secondary display screen defined in the display portion of the pair of glasses is synchronized with the main display screen area of the monitor of the computing device to allow user interaction at the respective display screen areas.

As part of user interaction, window 120b is moved out of the main display screen area 100A of the monitor 100, as illustrated in FIG. 2A. Programming logic executing at the computing device 10 detects the movement of window 120b out of the main display screen area of the monitor, and, in response, automatically begins to move a portion of the window 120b from the main display screen area 100A of the monitor 100, as illustrated in FIG. 2B. Simultaneously, the portion of the window that was moved out of the main display screen area is captured for rendering at the secondary display screen by the logic within the pair of glasses, as illustrated in FIG. 2B. FIG. 2C illustrates the completion of the movement of the window 120b out of the monitor area by ceasing the rendering of the window 120b in the main display screen area 100A and simultaneously rendering the window 120b in the secondary display screen 102A. The remaining windows 120a and 120c continue to render in the main display screen area 100A of the monitor 100.

In one embodiment, as part of user's continued interaction, a user selects a particular window rendered on the secondary display screen of the glasses. In this embodiment, the user selection causes the selected window to cease rendering in the secondary display screen and instead begin rendering it in the main display screen area of the monitor. Upon moving the window to the main display screen area of the monitor, subsequent user interactions are used as input to the application executing in the selected window or the icon causing changes to the content, display or both. In another embodiment, as part of user's continued interaction, a user selection of a particular application or icon window will cause the selected window to remain in the secondary display screen of the glasses and the user interaction is used as input to the application executing therein or the icon to present changes to the content, display or both at the selected window.

In the various embodiments illustrated in FIGS. 1, 1-1, 1-2, 2A and 2B, the computing device is synchronized with the pair of glasses and a user's eye movement (either up in accordance to the disposal location of the secondary display screen in the pair of glasses or straight) is used to view the appropriate screen area—either the main display screen area of the monitor or the secondary display screen area of the glasses.

In one embodiment, instead of the user's eye movement, movement of the user's head in different directions may be used to present appropriate application or icon windows from a portion of the main display screen of a monitor or a portion of secondary display screen defined in a pair of glasses, to a user. A pair of glasses is first paired with the computing device. The pair of glasses has an identifier associated with a user account of a user. The pair of glasses includes a processor that is configured to provide wireless communication with the computing device. A glasses display screen is defined in at least a portion of the pair of glasses. After the computing device and the pair of glasses of the user are paired, a view position of the pair of glasses is determined. The view position defines the user's normal view angle when the user is wearing the glasses. The view position, and hence the normal view angle, of the user wearing the glasses is determined by a reference point provided in relation to the main display screen. The reference point may be defined by one or more virtual position markers disposed in relation to the main display screen and coordinates of the reference point in relation to the main display screen is used in determining the view position for the pair of glasses. The normal view angle is then used to compute view offsets in response to the shift in the user's view angle as the user moves his head away from the main display screen. Based on the computed view offsets, appropriate content from either the main screen area of the display portion of the monitor or a virtual screen area defined by the secondary display screen, is presented.

Figure 3:
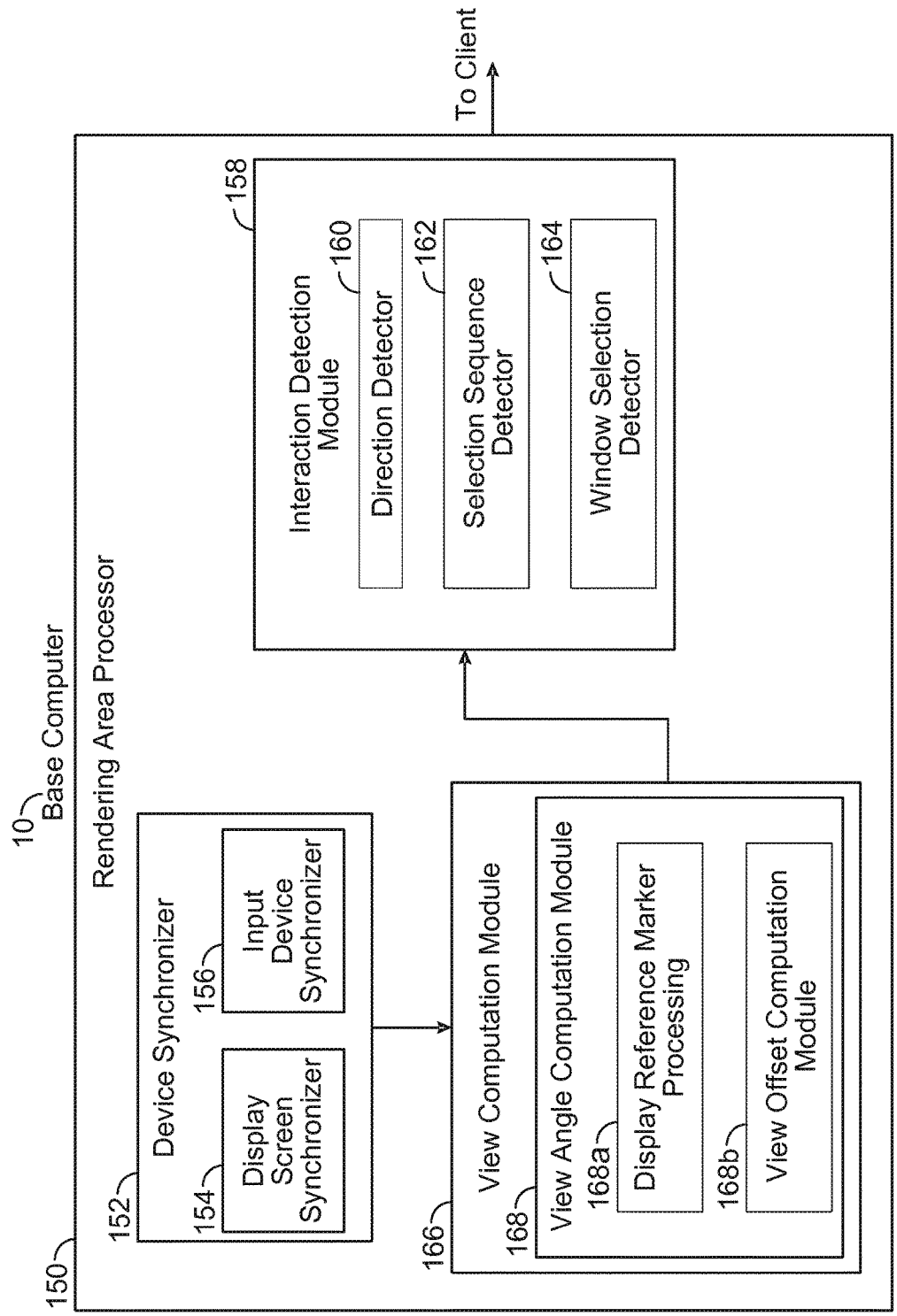
FIG. 3 illustrates the various components of a rendering area processor disposed within a computing device that are used to provide additional screen area in a pair of glasses communicatively connected to the computing device for extending a viewing area of a display device associated with the computing device, in accordance with an embodiment of the invention.

FIG. 3 illustrates a computing device in which a rendering area processor module 150 executes to present main display screen area for rendering content of icons or applications selected for execution in a secondary display screen in distinct application windows, in accordance with one embodiment of the invention. In another embodiment, the rendering area processor module 150 may be disposed within a pair of glasses for extending a viewing area of a display device associated with a computing device. The rendering area processor 150 includes additional modules, such as a device synchronizer module 152, an interaction detection module 158 and a view angle computation module 166.

The device synchronizer 152 includes a display screen synchronizer 154 and an input device synchronizer module 156. The device synchronizer 152 is first used to synchronize the computing device with a pair of glasses, wherein processor and internet connectivity in the pair of glasses is used to pair with the computing device to enable wireless communication. The glasses includes a display area (i.e., a secondary display screen area) defined in a portion of either one or both of the glasses region. The display screen synchronizer 152 provides the necessary configuration logic to synchronize the secondary display screen area defined in the glasses with the main display screen area of a monitor associated with the computing device. Similarly, the input device synchronizer 156 includes configuration logic to synchronize/pair the input devices of the computing device with the glasses. As part of the input device synchronization, in one embodiment, the input devices of the computing device may be used to interact with windows rendered in the secondary display screen area of the glasses. In another embodiment, as part of the synchronization/pairing, the input devices of the glasses are synchronized/paired with the input devices of the computing device. Once the glasses and the computing device are synchronized/paired, the rendering area processor determines the normal view angle for a user wearing the pair of glasses by computing a view position of the pair of glasses in relation to a main display screen of the computing device.

In one embodiment, the view computation module 166 determines the view position using a view angle computation module 168 and one or more reference points, defined by virtual markers or identifiers that are disposed in the direction or in relation to a main display screen. For example, a display reference marker processing (or simply "marker processing") module 168a within the view angle computation module 168 may determine the view initialization angle associated with a user wearing the glasses, in relation to a virtual marker provided in relation to a defined section of the monitor, such as a center, associated with the computing device. In another example, virtual marker corresponding to each corner of the monitor may be used to determine the view initialization angle. Additional virtual markers corresponding to the center of each side of the monitor or virtual markers corresponding to other sections of the monitor may be used by the marker processing module 168a to determine the view initialization angle. The marker processing module 168a uses the coordinates of each of the one or more virtual markers/virtual points in determining the view initialization angle.

Figures 1, 4A:
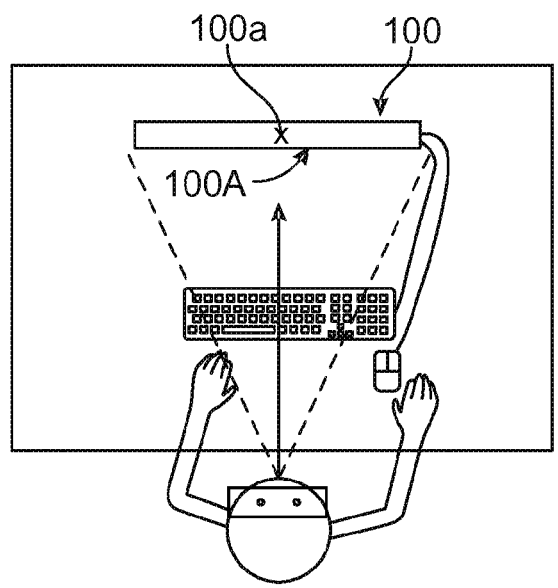
Figures 2, 4A:
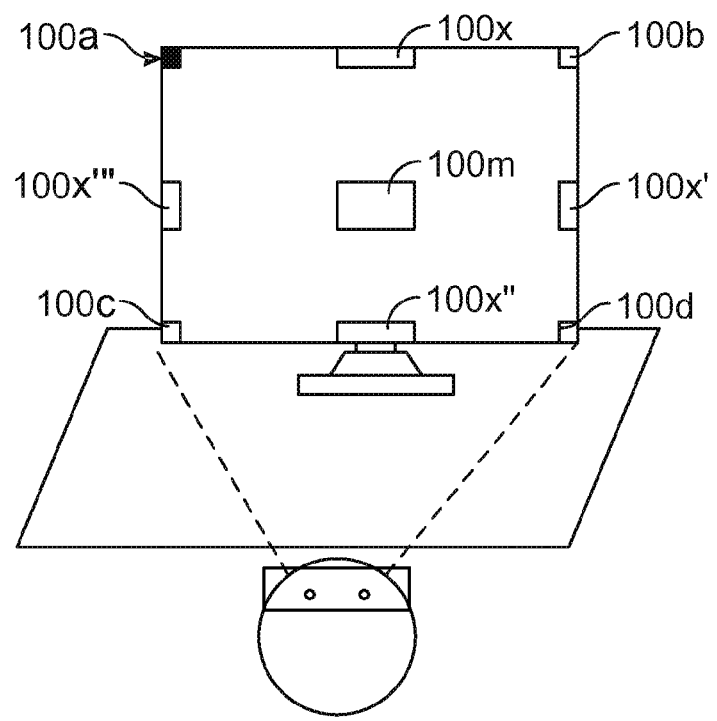
Figures 3, 4A:
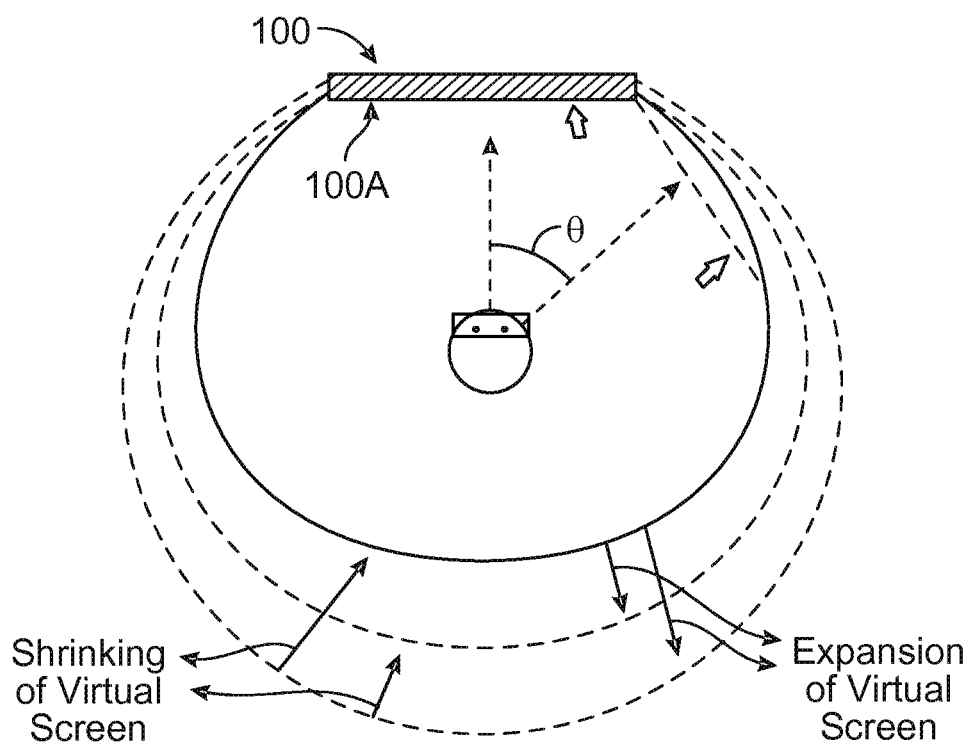

FIGS. 4A-1 and 4A-2 illustrates the view initialization angle for computing the view position that is determined using the marker processing module 168a. The marker processing module 168a determines the view initialization angle with relation to a single virtual marker 100a that corresponds to the center of a display area of the monitor 100A of the computing device, as illustrated in FIG. 4A-1. Alternately, the marker processing module 168a may determine the view initialization angle in relation to a plurality of virtual markers or virtual point indicators, as illustrated in FIG. 4A-2. In case of using the plurality of virtual markers/virtual point indicators, the marker processing module 168a may determine the view initialization angle in relation to virtual markers 100a, 100b, 100c, and 100d that correspond to each corner of the monitor display area. Additional virtual markers, such as the virtual marker 100m corresponding to the center of the display area of the monitor and/or virtual markers corresponding to the center of each side, 100x, 100x', 100x'', etc., may also be used when trying to compute the view initialization angle to determine the view position of the user wearing the glasses. The virtual markers in relation to the main display screen may be provided at the pair of glasses during view position initialization or the pair of glasses may use the center or corners of the main display screen of the computing device as the user wearing the pair of glasses is directed toward the main display screen.

A user may select to execute a plurality of applications that are available locally within the computing device or remotely on a cloud server. Each selected application is presented in a distinct interactive application window on the main display screen area of the monitor. As the user selects more and more applications for execution, corresponding application windows are presented in the main display screen area for user interaction. During the course of the interaction, the user may select to move some of the application windows out of the main display screen area. The moving causes the selected ones of the application windows to stop rendering on the main display screen area and instead begin rendering in a secondary display screen defined in the pair of glasses. In one embodiment, the secondary display screen acts as a virtual screen defining an endless circular loop of rendering area providing the user with almost a 360° angle view-screen for rendering the application windows, as illustrated in FIG. 4A-3. The size of the virtual screen defined by the secondary display screen dynamically adjusts to accommodate the application windows that are moved out of the main display area. In addition to applications selected for execution, the user may also select to render one or more icons. The selected icons are rendered in distinct application windows on the main display screen area of the monitor and when moved out of the main display screen begin to render in the secondary display screen area.

Subsequent to the movement of the application windows from the main display screen area of the monitor to the secondary display screen, the rendering area processor 150 may present the appropriate application windows from either the main display screen area or a secondary display screen. In order to determine which of the application windows to present to the user, a view offset computation module 168b within the view angle computation module 168 is used to determine the angle offset associated with the pair of glasses worn by a user as the user's head shifts in relation to the view initialization angle determined by the reference marker processing 168a. As shown in FIG. 4A-3, when the angle offset is zero, the user's view position is at the view initialization angle in relation to the monitor of the computing device and the application windows rendered in the main display screen area are presented in the secondary screen area of the pair of glasses. As the user turns his head around, the offset angle correspondingly changes. The view angle computation module 166 computes the offset angle, '$\Theta$', in relation to the view initialization angle and uses the offset angle $\Theta$ to determine the corresponding portion of windows from the virtual screen for presenting in the secondary display screen for the user. As select ones of the application windows rendered on the main display screen area of the monitor are moved out, the selected application windows are moved into the virtual screen area and rendered in the secondary display screen based on the view offset recorded for the pair of glasses. The endless circular loop of rendering area defined by the virtual screen covers both the main display screen area and the secondary display screen area, thus, providing a seamless extension of the viewing area defined in the main display screen.

Figure 4B:
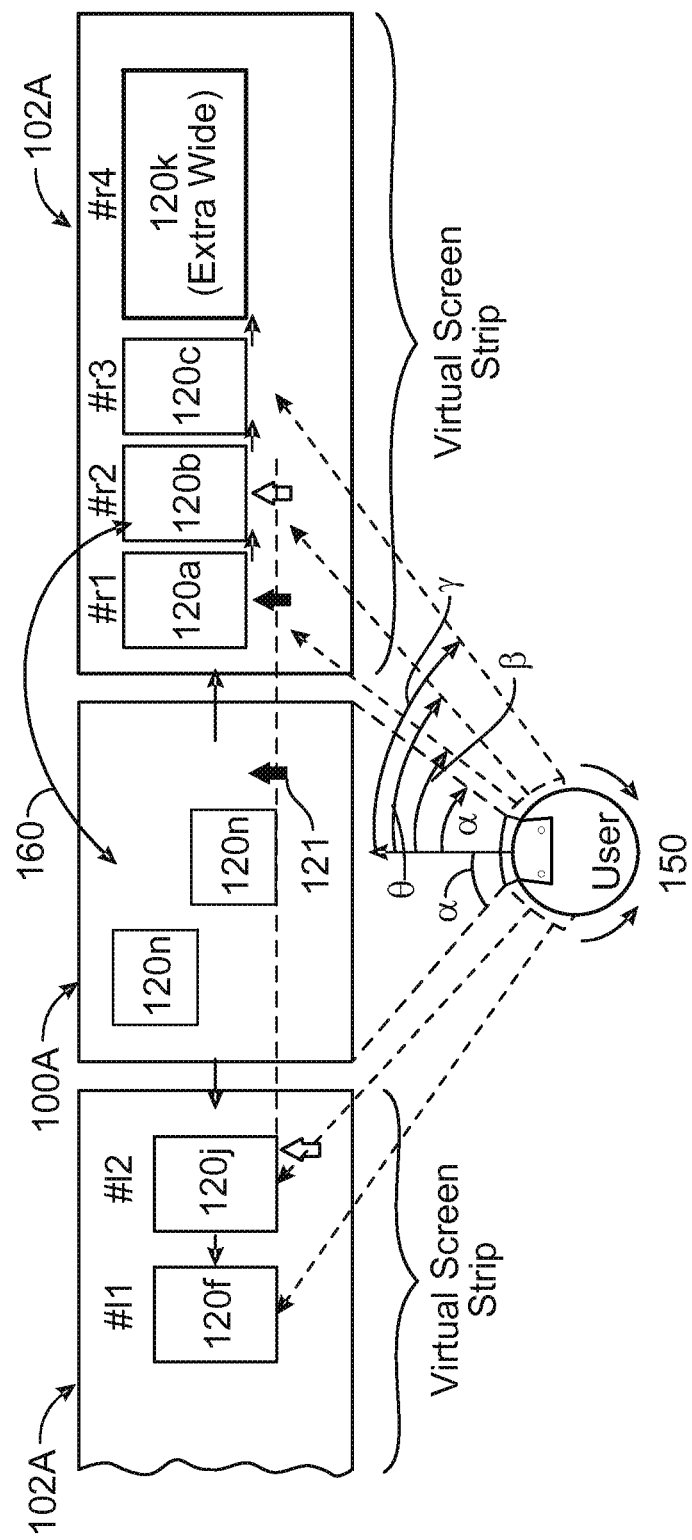
FIGS. 4B-4C illustrate the content rendered in accordance to the view angle of a user wearing the pair of glasses, in accordance with one embodiment of the invention.

FIG. 4B illustrates a simple rendition of the main display screen area 100A and the secondary display screen 102A used for rendering the interactive application windows. The main display screen area 100A, for example, encompasses an area defined by the normal initialization angle of the user encompassing view angle '$\alpha$'. As the user's head moves from the normal initialization angle '$\alpha$' to view offset angles defined by angles '$\beta$', '$\theta$', '$\gamma$', etc., content from the virtual screen corresponding to the respective view offsets are presented to the user in the secondary display screen. In the example illustrated in FIG. 4B, the view offset '$\beta$' may identify a portion of the virtual screen that includes application window 120a that was moved out of the main display area of the monitor. As a result, the application window 120a will be presented to the user at the display screen of the glasses (i.e., secondary display screen area) when the user's head moves to cover view offset '$\beta$'. Similarly, when the user's head shifts to cover view offset '$\theta$', application window 120b may be rendered in the display screen of the glasses, and so on. Based on the view angle established by the user's head movement, appropriate application windows are presented to the user in the display screen defined in the glasses. It should be noted, as an example, that only one application window has been identified for each view offset and additional application windows may be presented at each view offset. The application windows rendered in the corresponding display areas present content from one or more interactive applications or icons. As a result, in addition to rendering the appropriate application windows, one or more input devices may be made available for user interaction. For example, input devices, such as a mouse, as illustrated by the cursor 121, keyboard (not shown), etc., associated with the computing device may be provided for user selection and interaction.

User interaction may include user selection of an application window rendered in either the main display area or the virtual screen area. In one embodiment, the user selection of an application window in the virtual screen area causes the selected application window to be moved from the virtual screen area back to the main display area of the monitor, as illustrated by arrow 160. Subsequent user interactions at the selected application window are used as input to the application executing therein resulting in updates to the content and/or display and such updates are rendered in the application window in the main display area of the monitor.

In another embodiment, the user interaction may result in maintaining the selected application window in the virtual screen area. In this embodiment, user selection and interaction of specific application window in the virtual screen area may be to keep the selected application window(s) for private viewing of the user. As a result, the virtual screen area acts as a private screen area for the user while the main display area acts as a publicly viewable screen. In this embodiment, further user interactions at the selected application window are used as input to the corresponding application resulting in updates to the content and/or display and such updates are rendered within the respective application window and presented in the secondary display screen when the view offset corresponds to the location of the respective application window. The application windows continue to render in the virtual screen area and the user interactions are used as input to the application executing therein. Content of the applications/icons, including updates, are presented in the secondary screen area defined in the glasses as the view offset of the glasses matches the rendering location of the applications windows.

Figure 4C:
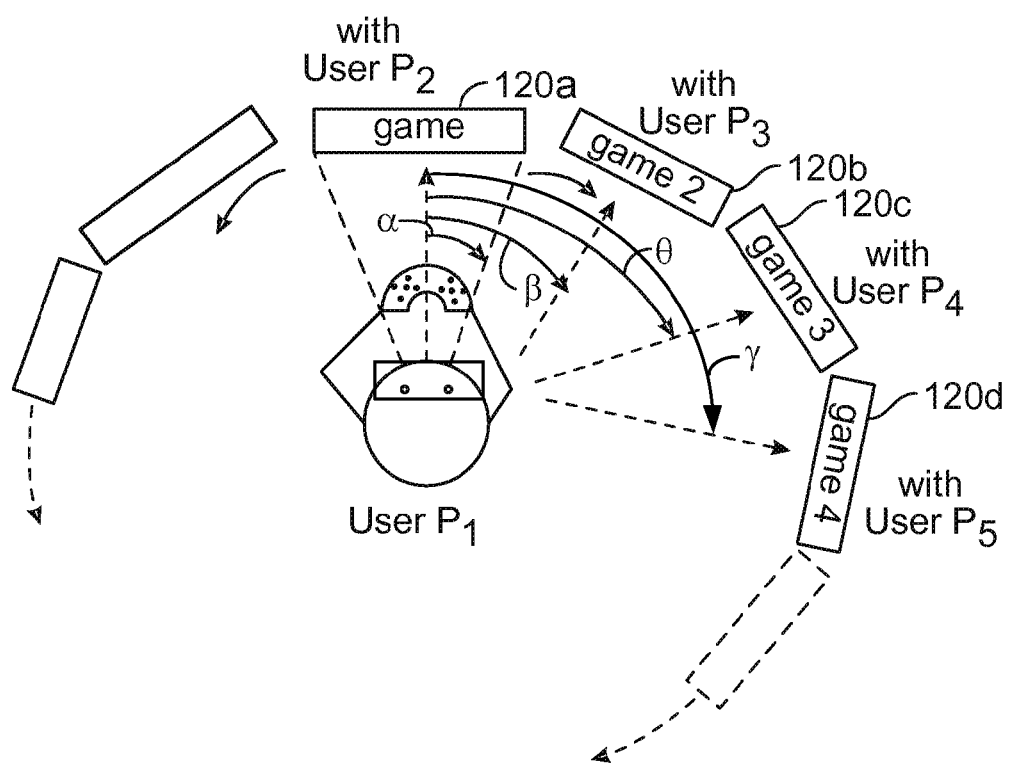

FIG. 4C illustrates one such example of a simplified screen representation of a main display area and a virtual screen area at various view angles corresponding to the user's head movement, in one embodiment. In this embodiment, the pair of glasses are configured to be worn on a head of a user and the view direction of the pair of glasses is determined by head tracking using a camera of the computing device associated with the main display screen. The virtual screen area includes a plurality of application windows that have been moved from the main display screen area by a user and presented as virtual displays. It should be noted that although the embodiment is being described with reference to executing interactive applications, the teachings can be extended to icons or any other content that can be rendered in a main or virtual display screen area. In the embodiment illustrated in FIG. 4C, for example, each of the applications that are rendered in the respective application windows corresponds to a video game. Alternately, the application can be a document rendering application. A user 'P1' plays video game 1 with game participant P2 when the user's view angle corresponds to initialization angle defined by angle '$\alpha$'. The video game 1 is rendered in application window 120a in the main display area defined in the monitor of the computing device. When the user's head shifts to view angle '$\beta$', the user may be presented with application window 120b corresponding to video game 2. In application window 120b, the user may be playing video game 2 with game participant P3. When the user's head shifts to view angle '$\theta$', the user may be presented with application window 120c in which video game 3 is executing and the user may be playing video game 3 with game participant P4. It should be noted that the video games 1, 2, 3, etc., may be distinct video games or may be different instances of the same video game played against different players. Alternately, each application window may present a distinct video game or different instances of a single video game and the user may play the interactive video game(s) on his/her own. Video games 2, 3, 4, etc., may be rendering in the virtual screen area while video game 1 is rendering in the main display screen area of the monitor. In this embodiment, the user will interact with the respective game participants (if available) from within the corresponding display screen area where the games are being rendered.

In one embodiment, as the view angle of the user changes based on the user's head movement, appropriate application windows are presented to the user in the display screen area of the glasses. In one embodiment, the display screen area of the glasses is used to present the application windows that are presented in the monitor as well as the ones that were moved to the virtual screen area. The user may continue to interact with the various application windows using the input devices, such as mouse, keyboard, controllers, etc., that are associated with the computing device or may use the input devices defined in the glasses.

The application windows rendered in the main display area of the monitor and the virtual screen area may be of equal size or may be of varying size. As a result, the rendering of the application windows in the respective display areas may be adjusted to accommodate the varying sizes. Further, the virtual screen area is adjusted to accommodate the number of application windows that are moved from the main display screen area of the monitor. As the number of application windows increases or decreases, the virtual screen area expands or shrinks in size, providing an endless loop of display area for rendering the application windows, as illustrated in FIG. 4A-3.

In one embodiment, the direction and sequence of movement of the application windows from the main display screen area of the monitor are used to define rendering sequence for the application windows as they are presented in the virtual screen area, wherein the windows in the virtual screen area may be presented in the display screen of the glasses in the order and direction of movement.

Continuing to refer to FIG. 3, in one embodiment, an interaction detection module 158 is used to detect user interaction at specific one of the application windows and to update the specific application window rendered in either the main display screen area of the monitor or the virtual screen area. A selection sequence detector module 162 identifies the sequence of movement of the application windows from the main display screen area of the monitor to the virtual screen area and organizes the application windows moved to the virtual screen area in the order of movement. In one embodiment, based on the sequence of movement of the application windows from the main display screen area of the monitor, the application windows may be organized in the virtual screen area in a chronological order. In another embodiment, the application windows may be organized in a reverse chronological order within the virtual screen area.

In addition to the sequence of movement, a direction of movement may also be used to organize and present the application windows in the virtual screen area. A direction detector module 160 within the interaction detection module 158 may be used to organize the application windows in either chronological or reverse chronological order based on the direction of movement. For example, as illustrated in FIG. 4B, application windows 120a, 120b, 120c, 120k, etc., are moved out of the main display screen area of the monitor from the right side, application windows 120f, 120j and 120x are moved out from the left side while application windows 120m and 120n are maintained in the main display screen area of the monitor. Accordingly, the application windows are organized in the virtual screen area in accordance to the side in either a chronological or a reverse chronological order, and the organized windows are presented at the secondary screen area based on the view offset.

User interaction at the respective application windows rendered in the virtual screen area and viewed in the secondary screen area, is detected by a window selection detector module 164. In one embodiment, the user interaction may be in the form of a gesture provided at the secondary display screen. For example, the gesture may include a single click, a double-click, a drag-and-drop gesture, a voice command, an eye gesture, eye gaze detection and selection, or combinations of two or more thereof. The list of gesture is exemplary and should not be considered restrictive. Additional selection gestures may be employed at the application window in the virtual screen area. In response to the user interaction, in one embodiment, the window selection detector module 164 may be configured to cease rendering of the selected application window in the virtual screen area and begin rendering the application window at the main display screen area of the monitor and using further interactions at the selected application window as input to the application executing within, causing changes to the content and/or display that is rendered in the application window. In another embodiment, the window selection detector module 164 is configured to detect the selection of a specific application window in the virtual screen area and use subsequent user interactions as input to the application rendered in the specific application window to update the content and/or display presented therein. In this embodiment, the application window remains in the virtual screen area and is not moved to the main display screen area of the monitor. The respective application windows Each of the application windows that are presented in the virtual screen area is associated with a position indicator. The position indicator may be indicative of the movement sequence or location placement that is predefined for the virtual screen area. The position indicator may be used during movement of the application from the virtual screen area to the main display screen area. For example, input tool, such as a voice recognition application, may be used as part of user interaction to move the application window between the virtual screen area and the main display screen area of the monitor using the position indicator. Thus, the various embodiments provide a seamless way of extending viewing area of the main display screen area of the monitor to allow the users to optimally use the screen area of the glasses to supplement the display area of the monitor.

In one embodiment, an eye glass computing device that is present proximate to a primary computing device is detected. The primary computing device is associated with a primary display, such as a main display screen, for rendering content. The eye glass computing device has a secondary display for rendering additional content. The eye glass computing device is linked to the primary computing device by pairing the two devices. The pairing may cause the pairing of input and output devices of the primary computing device with the eye glass computing device. A view direction of the eye glass computing device is detected relative to the primary computing device. In order to determine the view direction, the eye glass computing device is initialized in relation to the primary device.

The initialization results in determining the initial view angle or view position of the eye glass computing device when directed toward a primary display of the primary computing device using one or more virtual reference points defined in relation to the primary display. The view direction is then determined in relation to the one or more virtual reference points. The view direction identifies a view offset of the eye glass computing device based on the head tracking of a user wearing the eye glass computing device. Based on the determined view direction, additional content is rendered in the secondary display of the eye glass computing device while the content continues to render in the primary display of the primary computing device. The secondary screen acts as a virtual extension of the primary display providing an increased area for rendering the content. In some embodiments, the additional content may be content that was moved from the primary display through user interaction. The secondary display, in some embodiments, may act as a private screen area for a user and the additional content may be content that the user wishes to keep private away from the public eye. In these embodiments, the additional content is rendered as private virtual displays. The applications whose content are rendered in the primary display or the secondary display may be executed locally within the primary computing device or remotely on an application server. The application server may be a cloud server that is part of a cloud system. In some embodiments, the view direction may be updated by continuous head tracking and using changes (i.e., offsets) in the view direction to determine extent of additional content that has to be rendered in the secondary display. Head tracking can be enabled using one or more cameras provided at the primary computing device.

Figure 5:
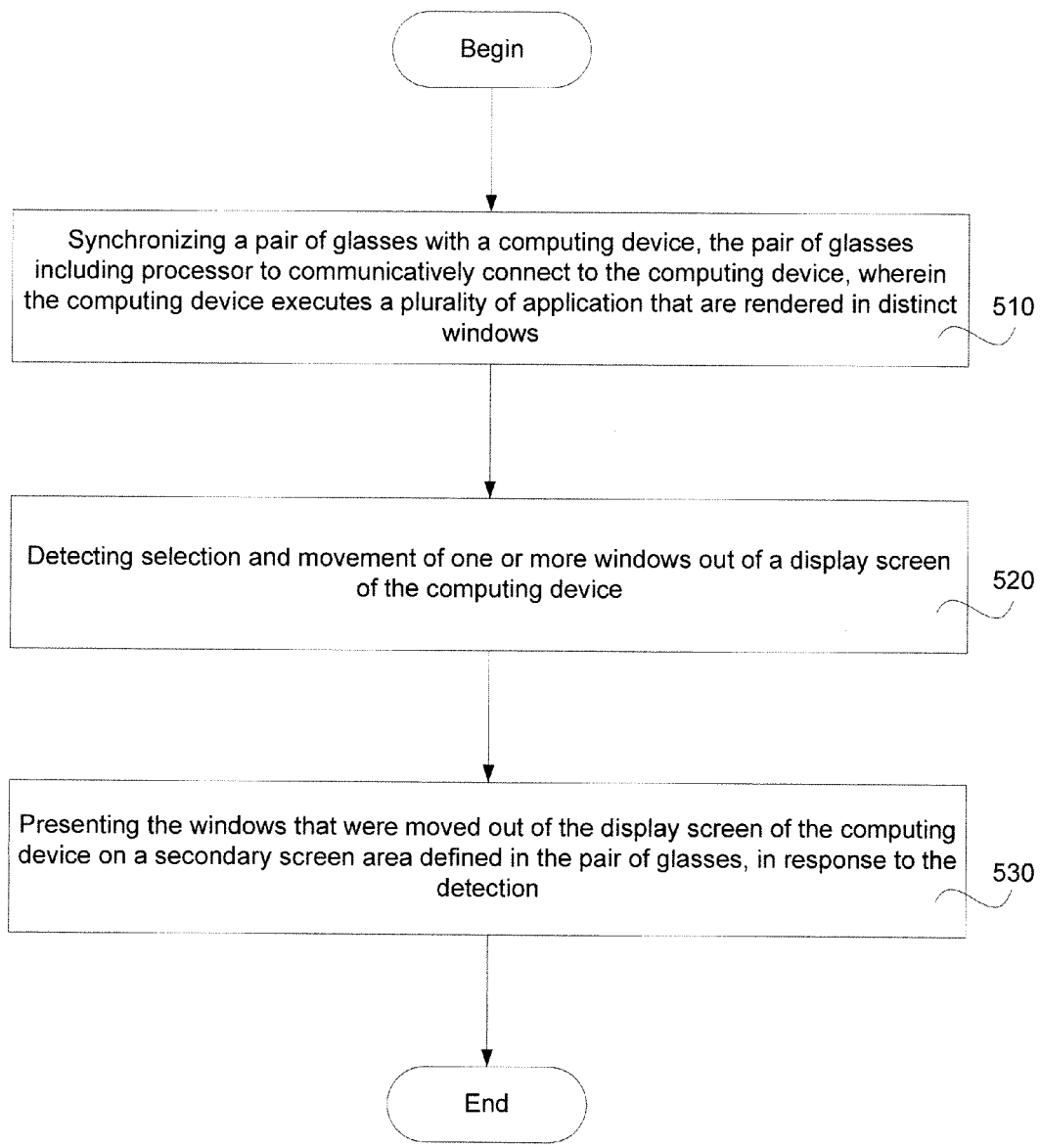
FIG. 5 illustrates process flow within a system for providing additional rendering area for application windows, in accordance with an embodiment of the invention.

FIG. 5 illustrates a method for proving additional viewing area for interactive applications, in accordance with an embodiment of the invention. The method begins at operation 510 where a pair of glasses is synchronized/paired with a computing device. The pair of glasses is equipped with a processor and network interconnectivity that is configured to communicatively connect with the computing device. The computing device is configured to identify and select a plurality of icons or other content for rendering in distinct application windows. The computing device is also configured to execute a plurality of applications that are available locally within the computing device or available remotely in a cloud server, wherein each of the applications is rendered in a distinct application window. Toward this end, the computing device is equipped with internet connectivity to access the cloud server over the internet and such access may be enabled using an internet access point, such as a router. The synchronizing/pairing of the devices includes synchronizing main display screen area of a monitor of the computing device with a secondary display screen defined in a portion of at least one of the pair of glasses. The synchronizing/pairing may also include synchronizing input devices such that the input devices of the computing device may be used for interacting with the application executing within the corresponding application windows rendered in either the display area of the monitor or the secondary display screen of the glasses.

In operation 520, user interaction at the one or more windows is detected. The user interaction may include movement of one or more windows out of the main display screen area of the monitor of the computing device. In one embodiment, the movement of the window may also identify sequence of movement and a direction or side from which the window was moved from the monitor. For example, the user interaction may identify the movement of one or more windows from the right side or from the left side of the monitor.

In operation 530, in response to movement of the one or more windows from the main display screen area of the monitor of the computing device, the windows are removed from the main display screen area of the computing device and presented in the secondary display screen defined in the pair of glasses. In one embodiment, the sequence of movement and the side from which the application windows are moved out of the main display screen area of the monitor are used to determine the organization of the application windows in the secondary display screen defined in the pair of glasses. The secondary display screen acts as an extension of the main display screen area for rendering the application windows.

Figure 6:
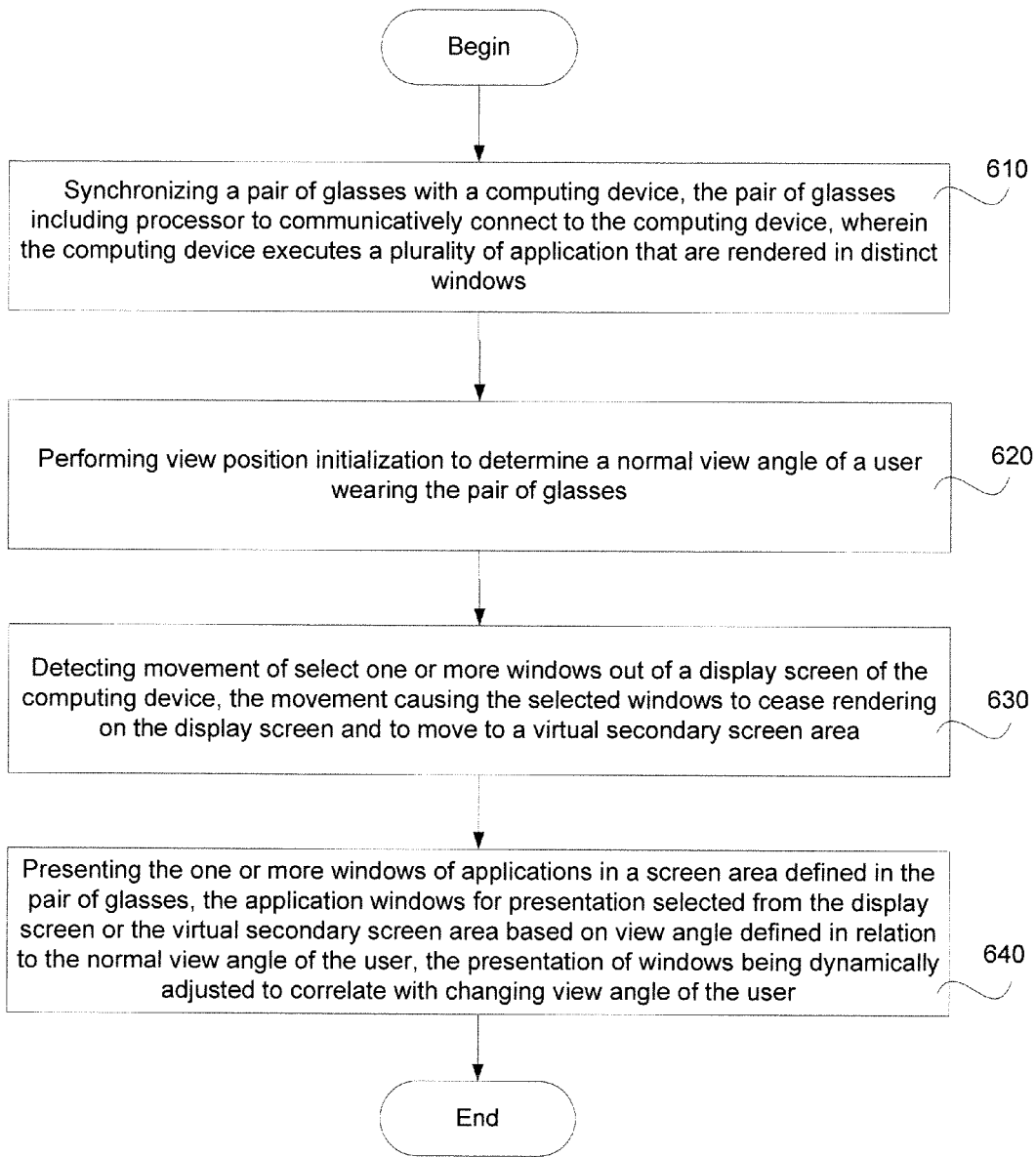
FIG. 6 illustrates process flow within a system for providing a virtual screen area for rendering application windows moved out of a display area of a computing device, in accordance with an alternate embodiment of the invention.

FIG. 6 illustrate method operations of a method, in accordance to an embodiment of the invention. The method begins at operation 610 wherein a pair of glasses with an identifier associated with a user account, is detected. The pair of glasses includes a processor wireless connectivity that is capable of communicating wirelessly with the computing device. The computing device is capable of selecting a plurality of icons as well as executing a plurality of applications available locally within the computing device or available remotely on a cloud server. The remote applications may be retrieved over a network, such as the Internet, and executed locally or may be executed at the cloud server using application interface.

In operation 620, a view position is associated with the pair of glasses. The view position is computed by determining normal view angle of a user wearing the pair of glasses, when the user is directed toward a main display screen of the computing device. In one embodiment, view position initialization may be performed using a camera mounted on the glasses or using one or more virtual reference points, markers or indicators that are provided in relation to the main display screen area of the monitor. Once the normal view angle is computed, view offset may be easily determined for a user wearing the glasses based on position of the head in relation to the normal view angle.

Content is rendered on the main display screen area of the monitor and additional content is rendered on the glasses display screen defined in the pair of glasses, as illustrated in operation 630. The additional content rendered on the glasses display screen are adjusted based on the detection of a change in the view position of the pair of glasses that is away from the main display screen. In one embodiment, the additional content is content that is moved out of the main display screen area of the computing device and into a virtual screen area. The content in the virtual screen area is rendered in the glasses display screen when a change in the view position of the pair of glasses away from the main display screen, is detected. The virtual screen area acts as a virtual extension of the main display screen and the glasses display screen is used to render the content that is moved to the virtual screen area.

The various embodiments discussed above provide a way to define a virtual heads-up display (HUD) in a pair of glasses for presenting application windows for rendering content of icons and applications that are selected for execution by a computing device. The applications may be video games, video files, word documents or any other application. The secondary display screen may act as a private screen that can track head movement to make it a virtual floating HUD. The secondary display screen enables a seamless extension of a viewing area defined in the main display screen of the computing device.

Figure 7:
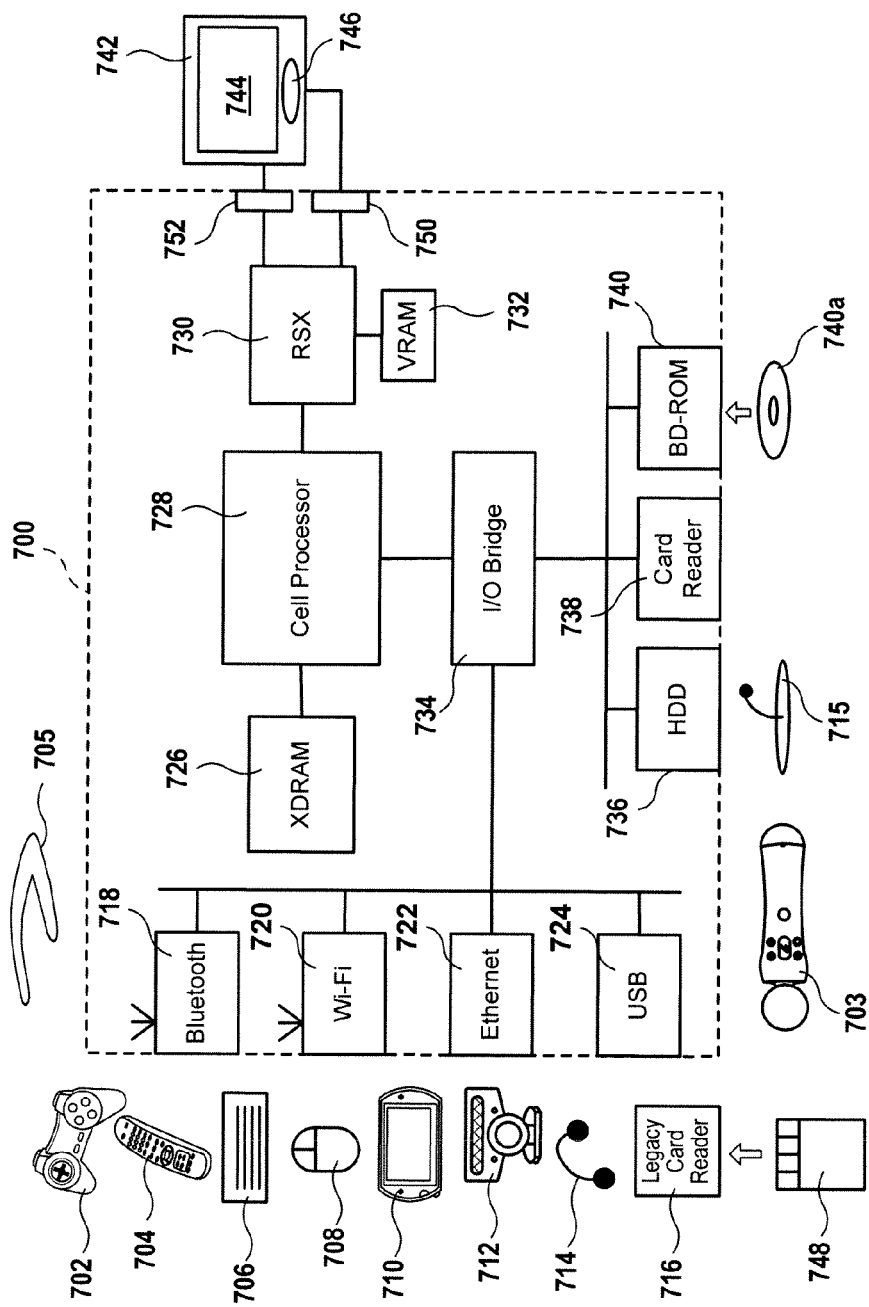
FIG. 7 schematically illustrates the overall system architecture of the Sony® Playstation 3® entertainment device, a console that may be compatible for interfacing a control device and a handheld device with a computer program executing at a base computing device in accordance with embodiments of the present invention.

FIG. 7 illustrates hardware and user interfaces that may be used to execute and render an interactive application, in accordance with one embodiment of the present invention. FIG. 7 schematically illustrates the overall system architecture of the Sony® Playstation 3® entertainment device, a console that may be compatible for interfacing a control device and a handheld device with a computer program executing at a base computing device in accordance with embodiments of the present invention. Playstation 3 is one example of the entertainment device used to execute and render an interactive application and that other entertainment devices may also be used in the execution and rendering of interactive application including earlier and later versions of the entertainment devices, such as PS4, PS Vita, etc., other entertainment devices, such as a personal computer, a smartphone, a tablet, etc. A system unit 700 is provided, with various peripheral devices connectable to the system unit 700. The system unit 700 comprises: a Cell processor 728; a Rambus® dynamic random access memory (XDRAM) unit 726; a Reality Synthesizer graphics unit 730 with a dedicated video random access memory (VRAM) unit 732; and an I/O bridge 734. The system unit 700 also comprises a Blu Ray® Disk BD-ROM® optical disk reader 740 for reading from a disk 740a and a removable slot-in hard disk drive (HDD) 736, accessible through the I/O bridge 734. Optionally the system unit 700 also comprises a memory card reader 738 for reading compact flash memory cards, Memory Stick® memory cards and the like, which is similarly accessible through the I/O bridge 734.

The I/O bridge 734 also connects to six Universal Serial Bus (USB) 2.0 ports 724; a gigabit Ethernet port 722; an IEEE 802.11b/g wireless network (Wi-Fi) port 720; and a Bluetooth® wireless link port 718 capable of supporting up to seven Bluetooth connections.

In operation, the I/O bridge 734 handles all wireless, USB and Ethernet data, including data from one or more game controllers 702-703. For example when a user is playing a game, the I/O bridge 734 receives data from the game controller 702-703 via a Bluetooth link and directs it to the Cell processor 728, which updates the current state of the game accordingly.

The wireless, USB and Ethernet ports also provide connectivity for other peripheral devices in addition to game controllers 702-703, such as: a remote control 704; a keyboard 706; a mouse 708; a portable entertainment device 710 such as a Sony Playstation Portable® entertainment device; a video camera such as an EyeToy® video camera 712; a microphone headset 714; and a microphone 715. Such peripheral devices may therefore in principle be connected to the system unit 700 wirelessly; for example the portable entertainment device 710 may communicate via a Wi-Fi ad-hoc connection, whilst the microphone headset 714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 716 may be connected to the system unit via a USB port 724, enabling the reading of memory cards 748 of the kind used by the Playstation® or Playstation 2® devices.

The game controllers 702-703 are operable to communicate wirelessly with the system unit 700 via the Bluetooth link, or to be connected to a USB port, thereby also providing power by which to charge the battery of the game controllers 702-703. Game controllers 702-703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 702 is a controller designed to be used with two hands, and game controller 703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 704 is also operable to communicate wirelessly with the system unit 700 via a Bluetooth link. The remote control 704 comprises controls suitable for the operation of the Blu Ray™ Disk BD-ROM reader 740 and for the navigation of disk content.

The Blu Ray™ Disk BD-ROM reader 740 is operable to read CD-ROMs compatible with the Playstation and PlayStation 2 devices, in addition to conventional pre-recorded and recordable CDs, and so-called Super Audio CDs. The reader 740 is also operable to read DVD-ROMs compatible with the Playstation 2 and PlayStation 3 devices, in addition to conventional pre-recorded and recordable DVDs. The reader 740 is further operable to read BD-ROMs compatible with the Playstation 3 device, as well as conventional pre-recorded and recordable Blu-Ray Disks.

The system unit 700 is operable to supply audio and video, either generated or decoded by the Playstation 3 device via the Reality Synthesizer graphics unit 730, through audio and video connectors to a display and sound output device 742 such as a monitor or television set having a display 744 and one or more loudspeakers 746. The audio connectors 750 may include conventional analogue and digital outputs whilst the video connectors 752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 700. The camera LED indicator is arranged to illuminate in response to appropriate control data from the system unit 700, for example to signify adverse lighting conditions. Embodiments of the video camera 712 may variously connect to the system unit 700 via a USB, Bluetooth or Wi-Fi communication port. Embodiments of the video camera may include one or more associated microphones and also is capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 700, an appropriate piece of software such as a device driver should be provided. Device driver technology is well-known and will not be described in detail here, except to say that the skilled man will be aware that a device driver or similar software interface may be required in the present embodiment described.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    detecting presence of an eye glass computing device proximate to a primary computing device having a primary display, the primary display of the primary computing device configured to render content, and the eye glass computing device including a secondary display;
    linking the eye glass computing device to the primary computing device, in response to the detection, wherein the eye glass computing device is worn by a user;
    detecting a view direction of the eye glass computing device relative to the primary device;
    providing additional content corresponding to the view direction for rendering in virtual displays within the secondary display, the additional content is in addition to the content provided for rendering in the primary display, the secondary display being an extension of the primary display that enables viewing of content beyond the content rendered on the primary display;
    wherein more or less of the additional content provided for rendering cause dynamic expansion or shrinkage of the virtual displays, so as to accommodate the additional content, the virtual displays of the secondary display extending to form a circular viewing area with the primary display, so as to render the content and the additional content.

2. A method, comprising:
    detecting a pair of glasses worn by a user, the pair of glasses identified using an identifier associated with a user account of the user, the pair of glasses having a processor for enabling wireless communication with a computing device and having a glasses display screen;
    associating an initial view position of the pair of glasses worn by the user, when directed toward a main display screen of the computing device, the initial view position of the pair of glasses being associated with a reference point defined in relation to the main display screen;

detecting a view direction of the pair of glasses during use, in relation to the reference point by computing a displacement offset of the pair of glasses from the reference point associated with the main display screen; and providing content for rendering on the glasses display screen based on the detected view direction, wherein the glasses display screen enables viewing content rendered on the main display screen and content moved from the main display screen into a virtual screen, the glasses display screen being a virtual extension of the main display screen, wherein more or less content moved to the virtual screen causes dynamic adjustment to a rendering size of the virtual screen, wherein operations of the method are performed by the processor.

3. The method of claim 2, wherein the view direction is detected by tracking the view position of the pair of glasses worn by the user, in relation to the reference point using a camera of the computing device.

4. The method of claim 2, further comprising, continuing to detect a change in the view direction of the pair of glasses worn by the user, the change in the view direction causes a change in the content provided for rendering in the glasses display screen, the content selected corresponds with the detected change in the view direction.

5. The method of claim 2, wherein the view direction of the pair of glasses is determined by tracking the pair of glasses relative to the computing device, using a camera of the computing device.

6. The method of claim 2, wherein the content moved into the virtual screen from the main display screen is organized in the virtual screen in distinct windows in accordance to direction and order of movement from the main display screen.

7. The method of claim 2, wherein the virtual screen defines a private screen area for rendering the content moved from the main display screen, the content in the private screen area providing access to only select ones of user accounts.

8. The method of claim 2, further includes, detecting selection of content moved into the virtual screen, the detection causing the selected content maintained in the virtual screen to be automatically moved from the virtual screen to the main display screen so as to allow interaction with the selected content at the main display screen using controls provided at the computing device.

9. A method for extending a viewing area of a display device for displaying content, comprising:

synchronizing a pair of glasses with a computing device, the synchronizing allowing a main display screen of the computing device to pair with a secondary display screen defined in the pair of glasses to enable movement of different content from the main display screen to distinct areas in the virtual screen of the secondary display screen, wherein the computing device is configured to execute a plurality of applications and select a plurality of icons for rendering in different areas on the main display screen of the computing device, wherein the pair of glasses is configured to be worn on a head of a user;

detecting movement of one or more content rendering in the distinct areas out of the main display screen of the computing device, wherein the content moved includes content provided by specific ones of the plurality of applications or select ones of the plurality of icons, the detection causes the content moved out of the main display screen to be associated with the secondary display screen instead of the main display screen; and providing the content from the main display screen or specific one of the content from the virtual screen for rendering on the secondary display screen, based on a view direction detected for the pair of glasses worn by the user, the view direction computed by determining a displacement offset of the pair of glasses worn by the user from a normal initialization angle defined for the main display screen, wherein the content in the main display screen or the secondary display screen are distinct, the secondary display screen acting to extend the main display screen, wherein the method operations being performed by a processor.

10. The method of claim 9, wherein the computing device is configured to execute the plurality of applications locally within the computing device.

11. The method of claim 9, wherein the computing device is configured to receive content of each of the plurality of applications executed on a cloud server within a cloud system.

12. The method of claim 9, wherein the pair of glasses includes a processor and a network connection interface to communicatively connect to the computing device, wherein the network connection interface of the pair of glasses uses a wireless connection protocol for interacting with the computing device.

13. The method of claim 9, wherein the synchronizing allows use of input and output devices of the computing device for interacting with the windows moved into the secondary display screen.

14. The method of claim 9, wherein detecting includes identifying direction and sequence of movement of the one or more content from the main display screen, the direction and sequence used in organizing the content in a virtual display of the virtual screen defined in the secondary display screen, the content being organized are associated with placement identifier.

15. The method of claim 9, wherein the content moved out of the main display screen are organized in the secondary display screen in either a chronological order or a reverse chronological order of movement from the main display screen.

16. The method of claim 9, further includes, receiving selection of content rendered in an area of the secondary display screen, the selection causing the selected content to cease rendering in the area defined in the secondary display screen and begin rendering in the main display screen of the computing device.

17. The method of claim 16, wherein the selection is through a gesture provided at the secondary display screen, the gesture includes one or more of a single click, a double-click, a drag-and-drop gesture, a voice command, an eye gesture, eye gaze detection and selection, or combinations of two or more thereof.

18. The method of claim 9, further includes, receiving selection of content presented in a specific area of the secondary display screen, the selection allowing interaction with the application providing the content rendered in the specific area while continuing to provide updates to the content of the application rendered within the specific area on the secondary display screen.

19. The method of claim 9, wherein the secondary display screen covers a portion or an entire area of one or both of the pair of glasses.

20. A method, comprising:
    detecting a pair of glasses having an identifier associated with a user account, the pair of glasses having a processor for enabling wireless communication with a computing device and having a glasses display screen, the pair of glasses configured to be worn on a head of a user;
    associating a view position for the pair of glasses when directed toward a main display screen of the computing device, the view position of the pair of glasses being associated with a reference point defined in relation to the main display screen; and
    rendering content on the main display screen and additional content on the glasses display screen, wherein the additional content is different from the content rendered on the main display screen, the additional content on the glasses display screen being rendered upon detecting a change in the view position of the pair of glasses that corresponds with coordinates of the additional content, such that the glasses display screen is a virtual extension of the main display screen, wherein the change in the view position is computed by tracking a current view position of the pair of glasses relative to the reference point, the additional content corresponds to content moved from the main display screen in to a virtual screen defined in the glasses display screen, wherein a rendering size of the virtual screen is dynamically adjusted based on amount of the additional content moved from the main display screen.

21. The method of claim 20, further includes performing a pairing of the pair of glasses to the computing device to enable detection of the pair of glasses.

22. The method of claim 21, wherein the pairing allows use of input and output devices of the computing device for interacting with the additional content rendered in the glasses display screen.

23. The method of claim 20, wherein the reference point is defined by one or more virtual position markers defined for the main display screen of the computing device, the view position defined using relative coordinates of the one or more virtual position markers.

24. The method of claim 20, wherein the content and the additional content includes one of content related to an icon and content of an application, the content being rendered in distinct areas.

25. The method of claim 20, wherein the additional content moved from the main display screen is organized in the virtual screen in accordance to an order and direction of movement from the main display screen.

26. A method, comprising,
    detecting presence of an eye glass computing device worn by a user proximate to a computing device having a primary display, the primary display of the primary computing device configured to render content, and the eye glass computing device having a secondary display that acts as a virtual screen;
    linking the eye glass computing device to the computing device, the linking enabling movement of different content from the primary display to distinct areas in the virtual screen of the secondary display, a size of the virtual screen being adjusted to accommodate the different content moved from the primary display;
    detecting a view direction of the user wearing the eye glass computing device relative to the primary display, wherein the view direction is computed by determining a displacement offset of the eye glass computing device worn by the user from a normal initialization angle defined for the primary display;
    providing the content from the primary display or specific one of the different content from the virtual screen for rendering in the secondary display, based on detected view direction of the user, the secondary display acting to extend the primary display to enable viewing the different content beyond the content rendered on the primary display; and
    continuing to detect changes in the view direction, such that the changes detected in the view direction defines which one of the different content from the virtual screen or content from the primary display needs to be provided for rendering on the secondary display,
    wherein the method operations being performed by a processor.

27. The method of claim 26, wherein the view direction is updated by tracking the eye glass computing device using a camera of the primary computing device.

28. The method of claim 26, wherein changes in the view direction present the different content moved into additional virtual displays defined in the virtual screen.

29. The method of claim 28, wherein more or less of the virtual displays are presented based on an amount of view offset defined by the view direction.

* * * * *